(12) United States Patent
Ransil

(10) Patent No.: US 6,554,116 B2
(45) Date of Patent: Apr. 29, 2003

(54) QUICK RELEASE ROLLER TRACK TOP PLATE

(75) Inventor: Matthew J. Ransil, Stevens, PA (US)

(73) Assignee: Morgan Corporation, Morgantown, PA (US)

( * ) Notice: Subject to any disclaimer, the term of this patent is extended or adjusted under 35 U.S.C. 154(b) by 36 days.

(21) Appl. No.: 09/943,107

(22) Filed: Aug. 30, 2001

(65) Prior Publication Data

US 2002/0070092 A1 Jun. 13, 2002

Related U.S. Application Data

(60) Provisional application No. 60/229,950, filed on Sep. 1, 2000.

(51) Int. Cl.[7] .............................................. B65G 13/00
(52) U.S. Cl. .................................................. 193/35 SS
(58) Field of Search ...................... 198/782; 193/35 SS; 414/535

(56) References Cited

U.S. PATENT DOCUMENTS

| | | | |
|---|---|---|---|
| 4,036,345 A | 7/1977 | Webb | 193/35 |
| 4,089,399 A | 5/1978 | Webb | 193/35 |
| 4,627,526 A * | 12/1986 | Masciarelli | 193/35 SS |
| 4,750,604 A | 6/1988 | Cook | 198/468 |
| 4,823,927 A * | 4/1989 | Jensen | 193/35 SS |
| 4,909,372 A | 3/1990 | Jones | 193/35 |
| 4,909,378 A | 3/1990 | Webb | 198/721 |
| 5,372,247 A | 12/1994 | Nishikawa | 198/780 |
| 6,193,043 B1 * | 2/2001 | Langston et al. | 193/35 SS |
| 6,382,385 B2 * | 5/2002 | Ransil et al. | 193/35 SS |
| 6,422,372 B2 * | 7/2002 | Ransil | 193/35 SS |

FOREIGN PATENT DOCUMENTS

| | | | |
|---|---|---|---|
| EP | 0 304 527 B1 | 3/1989 | 13/12 |
| EP | 0 359 870 A1 | 3/1990 | |
| WO | PCT/NL99/00055 | 8/1999 | 67/20 |

* cited by examiner

Primary Examiner—Joseph E. Valenza
(74) Attorney, Agent, or Firm—Carella, Byrne, Bain Gilfillan, et al.; Elliot M. Olstein; G. Glennon Troublefield

(57) ABSTRACT

A roller track assembly includes an outer channel member and inner channel member having rollers attached and which vertically displaces in the channel of the outer channel member in response to inflation of an inflatable air bag in the channel of the outer channel member. A top plate is quick release attached to the outer channel member by a detent arrangement and covers the outer channel member and inner channel member. The top plate has openings through which rollers rotatably secured to the inner channel member selectively protrude in response to inflation of the air bag. Sealing covers prevent debris entering top plate openings from falling into the interface regions between the inner and outer channel members.

15 Claims, 11 Drawing Sheets

QUICK RELEASE ROLLER TRACK TOP PLATE

The present application claims the benefit of and right of priority to U.S. Provisional Application Ser. No. 60/229,950 entitled "QUICK RELEASE ROLLER TRACK TOP PLATE" filed on Sep. 1, 2000 in the name of Matthew J. Ransil.

FIELD OF THE INVENTION

The present invention relates to a roller track conveying apparatus for conveying cargo loads in which rollers are selectively raised and lowered by an inflatable air bag.

Roller track assemblies are used to enable the movement of cargo loads, product or machinery within a predetermined location. Of interest are U.S. Pat. Nos. 4,909,378, 4,750,604, 4,909,372, 4,036,345 and 4,089,399, all of which are incorporated herein by reference. These patents relate to roller track mechanical handling systems that generally comprise an outer elongated channel member that receives an elongated inflatable air bag along the channel member length at the channel bottom region. The air bag is supplied with pressurized air to selectably inflate or deflate the bag. A second inner elongated channel member is nested within the outer channel member on the air bag. A series of rollers are rotatably secured to the inner channel member and are aligned with openings in a top cover plate that is secured to the outer channel member by a series of screws. The inner channel member rests on the air bag and is raised and lowered within the outer channel member as the air bag is inflated and deflated.

When the air bag is inflated, the rollers will raise to an exposed operative condition above the surface of the top plate to receive cargo to be displaced along the rollers. When the air bag is deflated, the rollers will recess into the outer channel member below the exposed surface of the top plate. The recessed rollers thereby permit cargo to rest on the top plate of the assembly and become relatively difficult to displace and stationary due to high static frictional resistance with the exposed surface of the plate. The top plate provides a flat surface on which cargo is supported or to allow fork lift truck traffic. A pressurized air line coupled to the air bag selectably pressurizes and deflates the air bag.

In a typical commercial arrangement, a series of elongated roller tracks are installed end to end in the cargo receiving area of a load carrying vehicle, such as a truck, to form a continuous linear track. The tracks are secured to and flush with the floor of the truck and are used to load cargo such as freight containers, pallets or the like into or out of the cargo bay. However, the loading or unloading of cargo from the cargo receiving area creates a problem.

For example, cargo may be loaded or unloaded into or from the cargo bay by fork lift trucks although the roller track assemblies are provided to avoid use of such fork lift trucks in the cargo bay area. The wheels of the fork lift trucks roll over the roller track assemblies. The repetitive action of the fork lift trucks rolling over the roller track assemblies top plates may eventually damage the top plates which then need to be replaced. Also, the top plates need to be removed periodically to service the internal components covered by the top plate. Replacing the top plate numerous screws for the many roller track assemblies in a given cargo region can be time consuming and is not cost effective.

SUMMARY OF THE INVENTION

To overcome these problems, it is desired to provide a top plate for a roller track assembly that is easily assembled and disassembled without the use of fasteners.

A track assembly for selectively supporting a load during movement of the load into position in an axial direction according to the present invention comprises an outer channel member having a bottom wall and oppositely disposed side walls defining a first channel extending in the axial direction. An inner channel member is included and extends in the axial direction. An inflatable air bag is disposed in the first channel for supporting the inner channel member, the inner channel member being movably disposed within the outer channel member for movement in a direction normal to the axial direction. A plurality of rollers are rotatably attached to the inner channel member, the rollers for moving between a lowered position to a raised position normal to the axial direction in response to the inflated condition of the air bag. A top plate has a series of openings through which the rollers project when the air bag is inflated. Detent means releaseably secure the top plate to the outer channel member.

In one aspect, the detent means comprises a plurality of pins in the outer member in an axially extending array and a plurality of slots in the top plate each of which mates with and releaseably engages a different pin.

In a further aspect, the slots have first and second portions in which a first portion is normal to a second portion, the first portion extending in a first direction parallel to the axial direction and the second portion extending in a second direction normal to the axial direction.

In a further aspect, the outer channel member side walls each further comprise a second axially extending channel, the pins extending transversely through the second channel transverse the axial direction, the top plate having an axially extending flange with the slots for engaging the second channel.

DETAILED DESCRIPTION OF THE INVENTION

Figure 1:
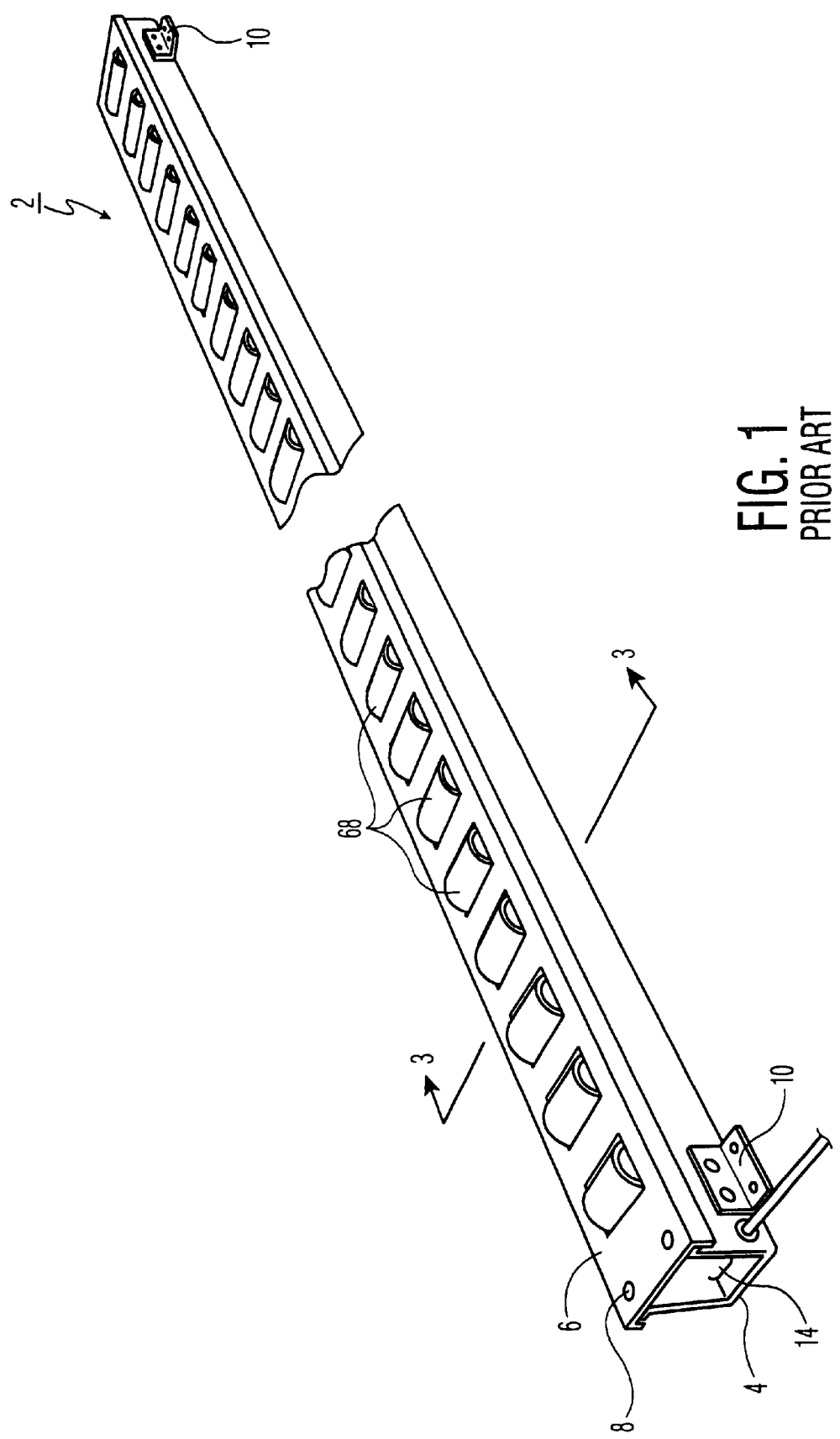
FIG. 1 is a perspective view of a prior art roller track assembly, in which a top plate of the present invention may be used
Figure 2:
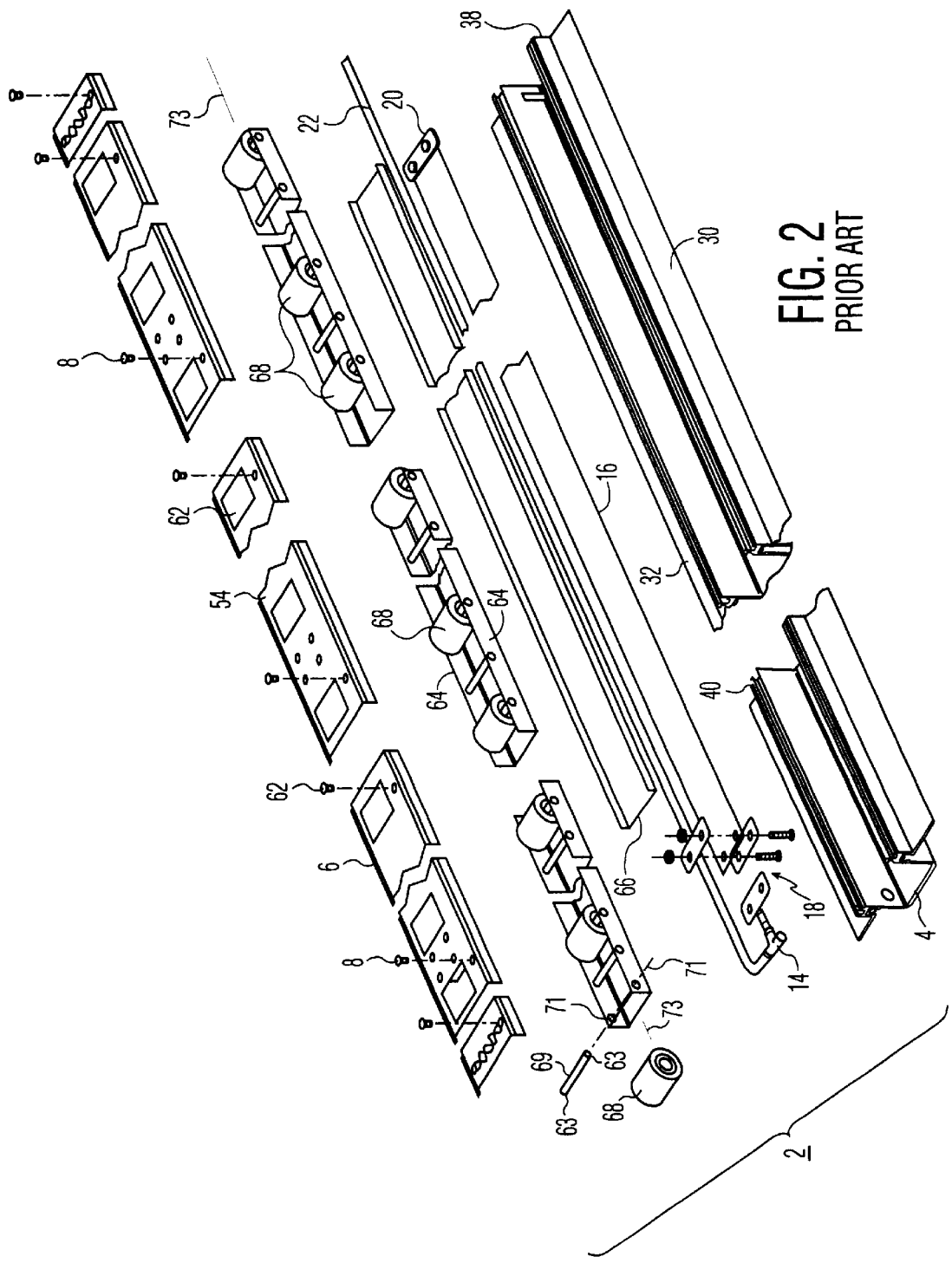
FIG. 2 is an exploded perspective view of the prior art assembly shown in FIG. 1.
Figure 3:
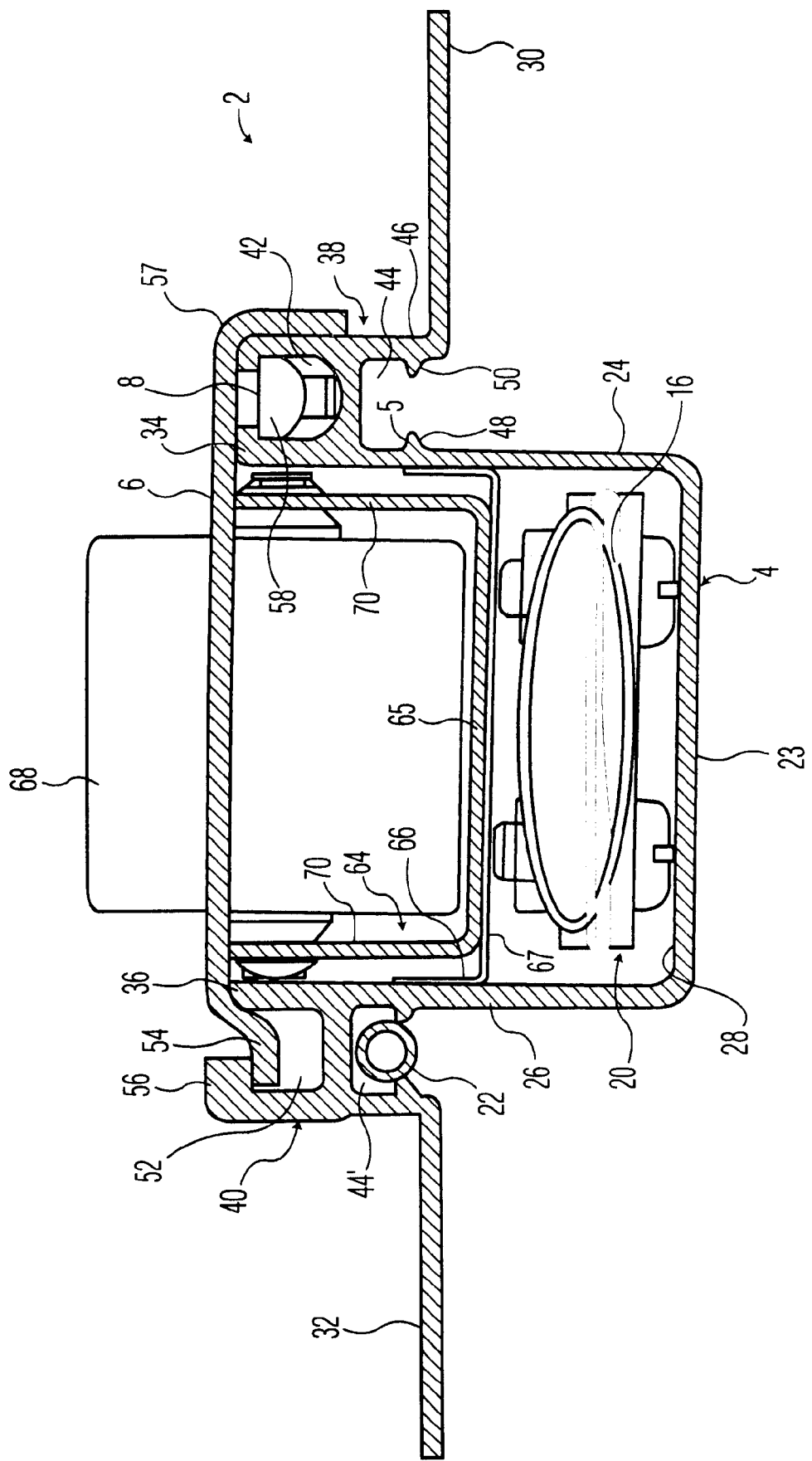
FIG. 3 is a cross-sectional view of the prior art assembly shown in FIG. 1, taken along lines 3—3.
Figure 4:
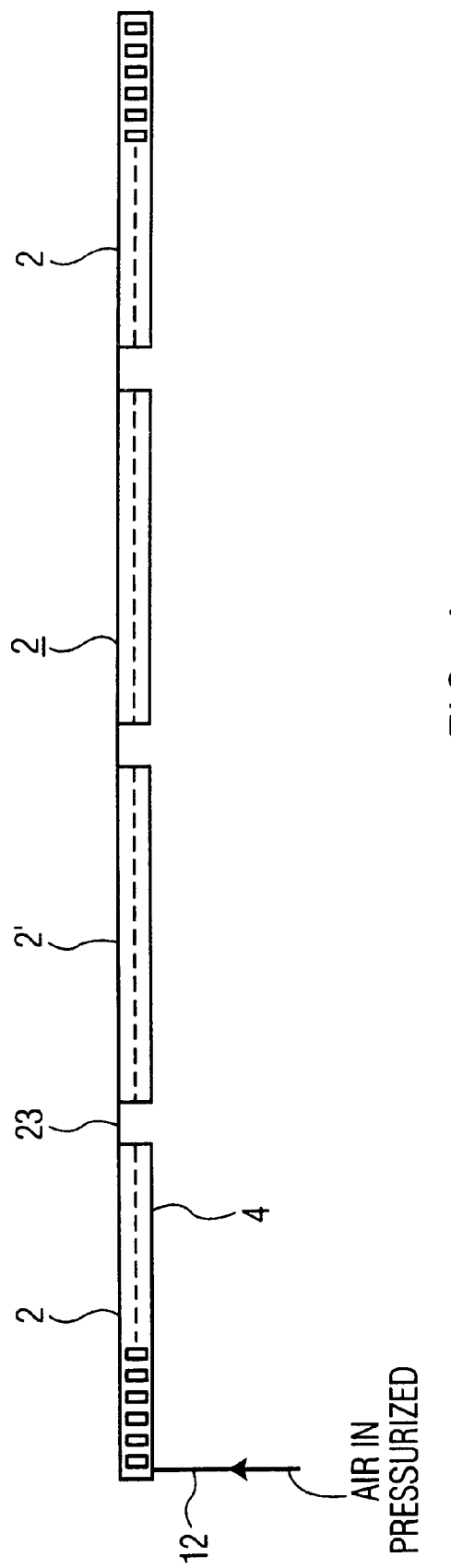
FIG. 4 is a top plan view of a series of individual prior art assemblies shown in FIG. 1, aligned in a linear track as used in a commercial application.

In the drawings, like reference numerals indicate like elements. Reference numerals that are primed have structure similar to elements with unprimed reference numerals. FIGS. 1 to 3 illustrate a prior art roller track assembly 2, comprising a stamped or extruded metal outer channel member 4 and a stamped metal top plate 6 secured to the channel member 4 with screws 8. Angle iron brackets 10 secure the outer channel member 4 to a floor of a cargo receiving area. FIG. 4 illustrates a linear array of roller track assemblies 2 coupled adjacent to each other to form a linear track for the mechanical transfer of cargo along a cargo receiving area.

In FIG. 1, a pressurized air inlet hose 12 is coupled to a fitting 14 at the end of channel member 4. The hose 12, which may be thermoplastic tubing, receives pressurized air from a fluid source not shown. The fitting 14 is connected to the end of an elongated inflatable air bag 16 (see FIG. 2) by a clamp assembly 18. The air bag 16 is relatively flat in the deflated condition depicted in FIG. 2 and is ballooned when inflated. See FIG. 3. See the aforementioned patents incorporated by reference for more detail on such an air bag and track assembly in general.

A clamp 20 seals the end of the air bag 16 opposite the clamp assembly 18. A further air hose 22 is connected to fitting 14 for connection to a further inlet fitting 14 (not shown in the figures) of the next adjacent track assembly 2' of the array of track assemblies, FIG. 4. In this way each successive air bag 16 is coupled to the inlet hose 12 in series.

In FIG. 3, the outer channel member 4 has a bottom wall 23 and two opposing side walls 24 and 26. Walls 24 and 26 form a channel receptacle 28 to house the air bag 16, the fitting 14, the clamp assembly 18 and clamp 20 (FIG. 2). Identical mirror image flanges 30 and 32 extend outwardly from a respective conduit member 38 and 40 attached to the respective corresponding side walls 24 and 26 adjacent to the upper respective edge regions 34 and 36 of the side walls. Flange 30 extends from conduit member 38 and flange 32 extends from conduit member 40. Conduit members 38 and 40 extend for the full length of the outer channel member 4 and, together with flanges 30 and 32 and walls 23, 24 and 26, are formed from an integral one piece metal extrusion, e.g., aluminum. Conduit member 38 has an axially extending conduit 42 and forms a top element of wall 24. An open channel 44 is beneath the conduit 42 and faces in a direction toward the bottom of wall 24 and bottom wall 23. Flange 30 extends from the bottom edge of the outer wall 46 of the channel 44.

Channel 44 is partially enclosed adjacent to the flange 30 by two opposing ribs 48 and 50 extending inwardly toward each other from the respective side walls 24 and 46. These ribs are generally triangular shaped and have a surface S normal to walls 24 and 46 from which they extend. The normal surfaces are located in the interior of the channel 44. The ribs 48 and 50 have a second surface opposite the surface S that extends from the walls 24 and 46 inclined to these walls forming a triangular cross section rib shape. The ribs 48 and 50 are spaced apart to form an opening therebetween that is smaller than the diameter of the air hose such as hose 22.

An air hose such as hose 22 is placed in the channel 44 by temporarily compressing and deforming the hose to fit in the space between the ribs 48 and 50 during insertion into the channel 44 (The hose is not placed in channel 44 in this embodiment). The hose 22 is in channel 44' identical to channel 44 and is not shown in channel 44 in FIG. 3. The edges of the ribs 48 and 50 are rounded to preclude damage to the hose 22 during insertion. The hose 22 is inserted for the length of channel 44 to the extent of the length of the hose and is releasably captured in the channel 44 by ribs 48 and 50. This retains the hose 22 for the length of the hose externally of the channel member 4 receptacle 28. This precludes vibration abrasion of the hose 22 because the hose is securely restrained from vibration for its length. The ribs 48 and 50 retain the hose for its length and preclude such vibration. In addition, since the hose 22 is substantially encased in the conduit member 38 channel 44, it is out of harms way and protected from potential damaging screw installation and drilling accompanying track installation.

Conduit member 40 has an identical channel 44' which receives the hose 22 in this embodiment. The hose 22 could in the alternative be placed in channel 44. Conduit member 40 also has an upper channel 52. A top plate 6 has a toggle lip 54 that is captured by an overlying lip 56 of conduit member 40. Plate 6 is screwed at its opposite edge 57 to conduit member 38 channel 42 by a nut 58 and mating screw 8 (FIG. 2). The top plate 6 has a plurality of rectangular openings 62, FIG. 2.

An inner sheet metal stamped channel member 64 is movably disposed within the outer channel member 4 in vertical directions. The inner channel member 64 has a bottom wall 65 that rests on the bottom wall 67 of a thermoplastic (e.g., Acetal) wiping channel member 66. The side walls of the member 66 slide along and relative to the inner surfaces of the outer channel member side walls 24 and 26 in up and down reciprocal motion of the inner channel member 64 and seal the receptacle 28 containing the air bag 16. These up and down motions are in response to inflation and deflation of the air bag 16 which moves the inner channel member 64 up and down relative to the outer channel member 4. In FIG. 3 the air bag 16 is shown spaced from the bottom wall 67 for clarity of illustration, these elements normally abutting when the air bag is inflated. The inner channel member 64 has oppositely disposed, upstanding side walls 70 that form a channel that extends axially along axis 73. (FIG. 2.)

Cargo support rollers 68 are rotatably attached to side walls 70 of the inner channel member 64 by roller pins 69. As best seen in FIG. 2, the roller pins 69 pass through oppositely disposed holes 71 formed in side wall 70. The rollers 68 move up and down intermediate a vertical lower, recessed condition and a vertical raised, operative condition with the inner channel member 64 as the air bag 16 is inflated and deflated. When the air bag 16 is inflated, the rollers 68 pass through the openings 62 in the top plate 6, as depicted in FIG. 3. This is described in more detail in the aforementioned patents. Except for the channels 44 and 44' and ribs 48 and 50, the remaining structures are described in the aforementioned patents and need not be described in more detail herein.

Figure 5:
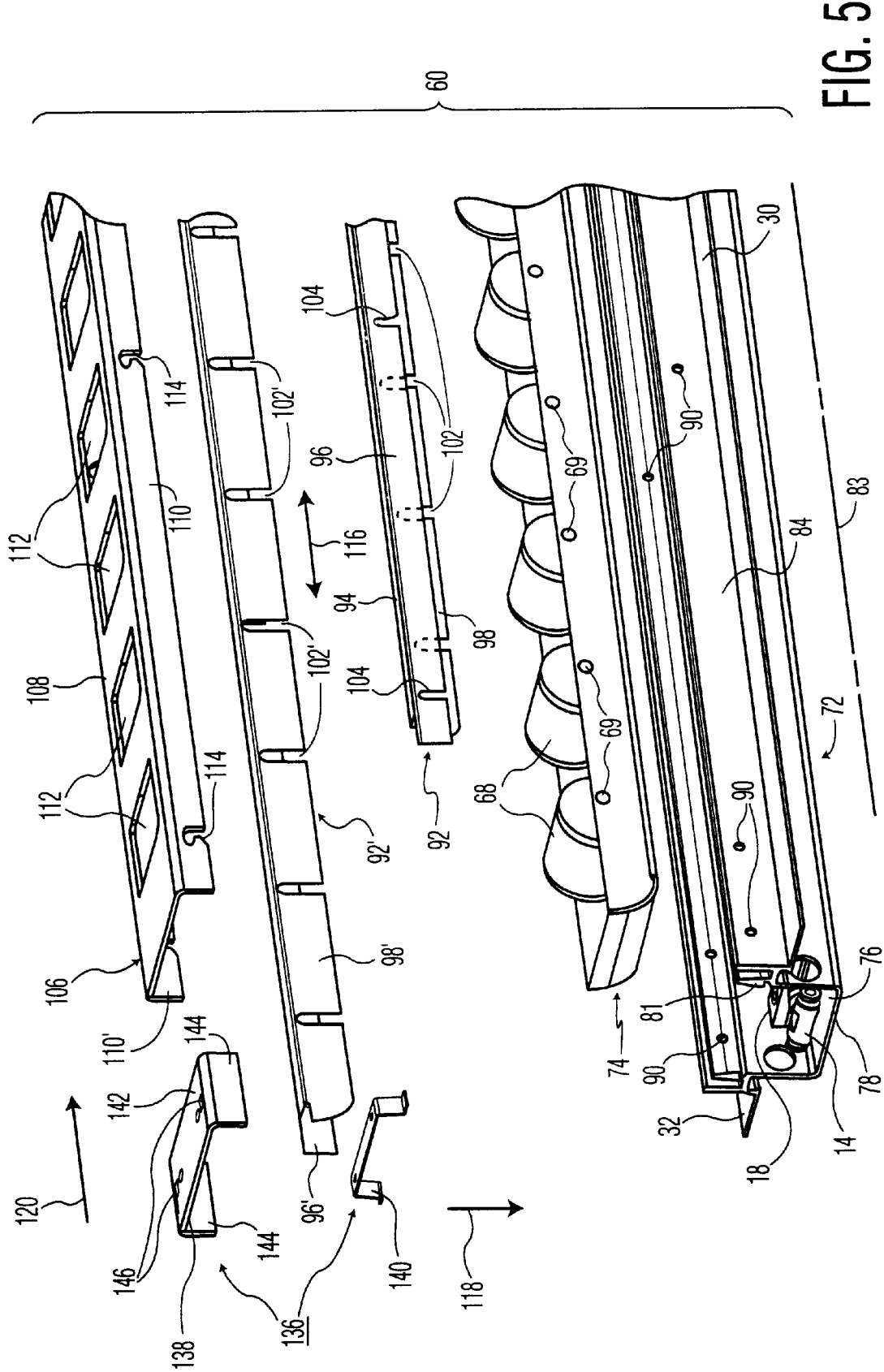
FIG. 5 is a fragmented exploded view of a roller track assembly, illustrating an embodiment of the of the present invention.
Figure 6:
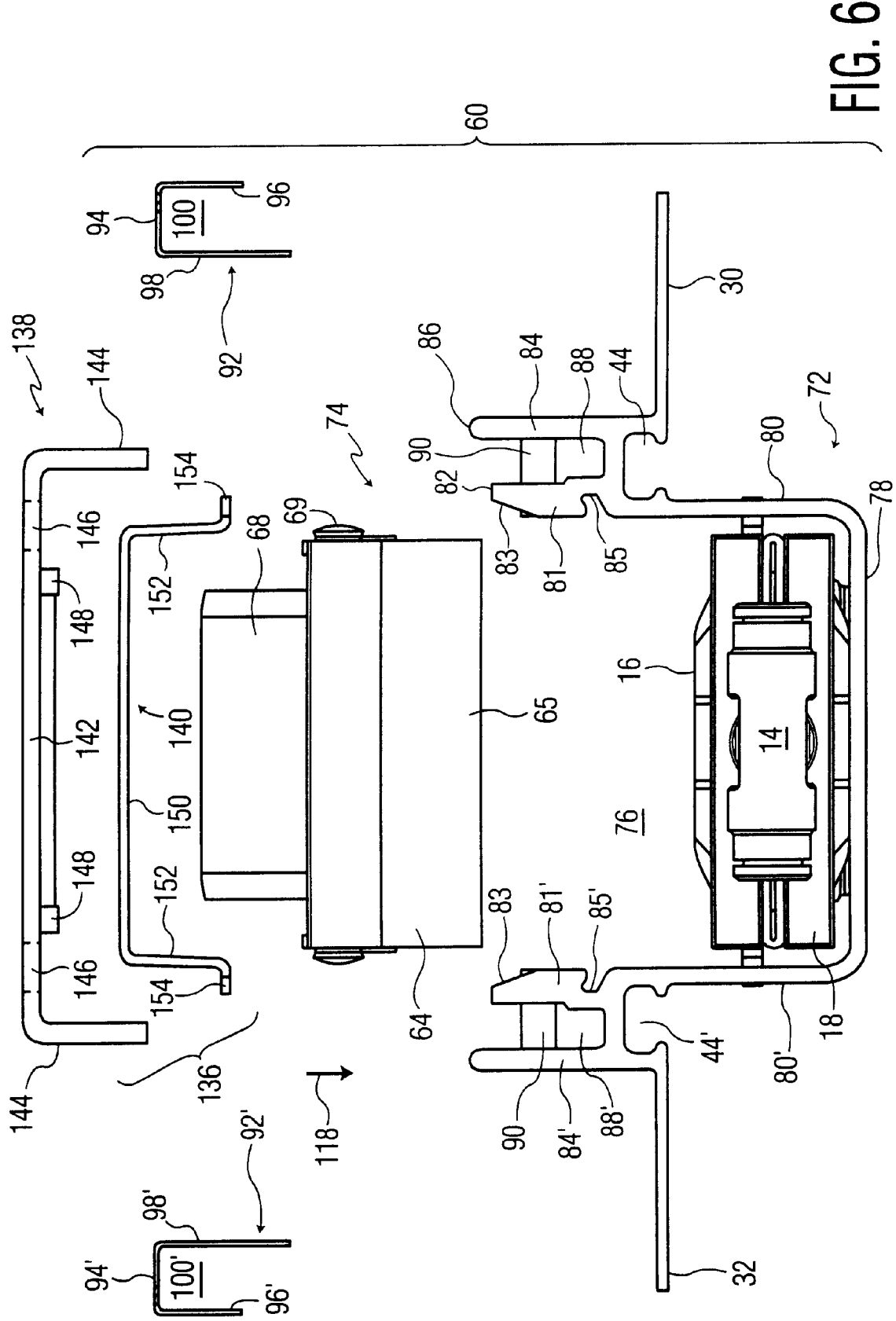
FIG. 6 is an exploded end view of a roller track assembly of FIG. 5.
Figure 7:
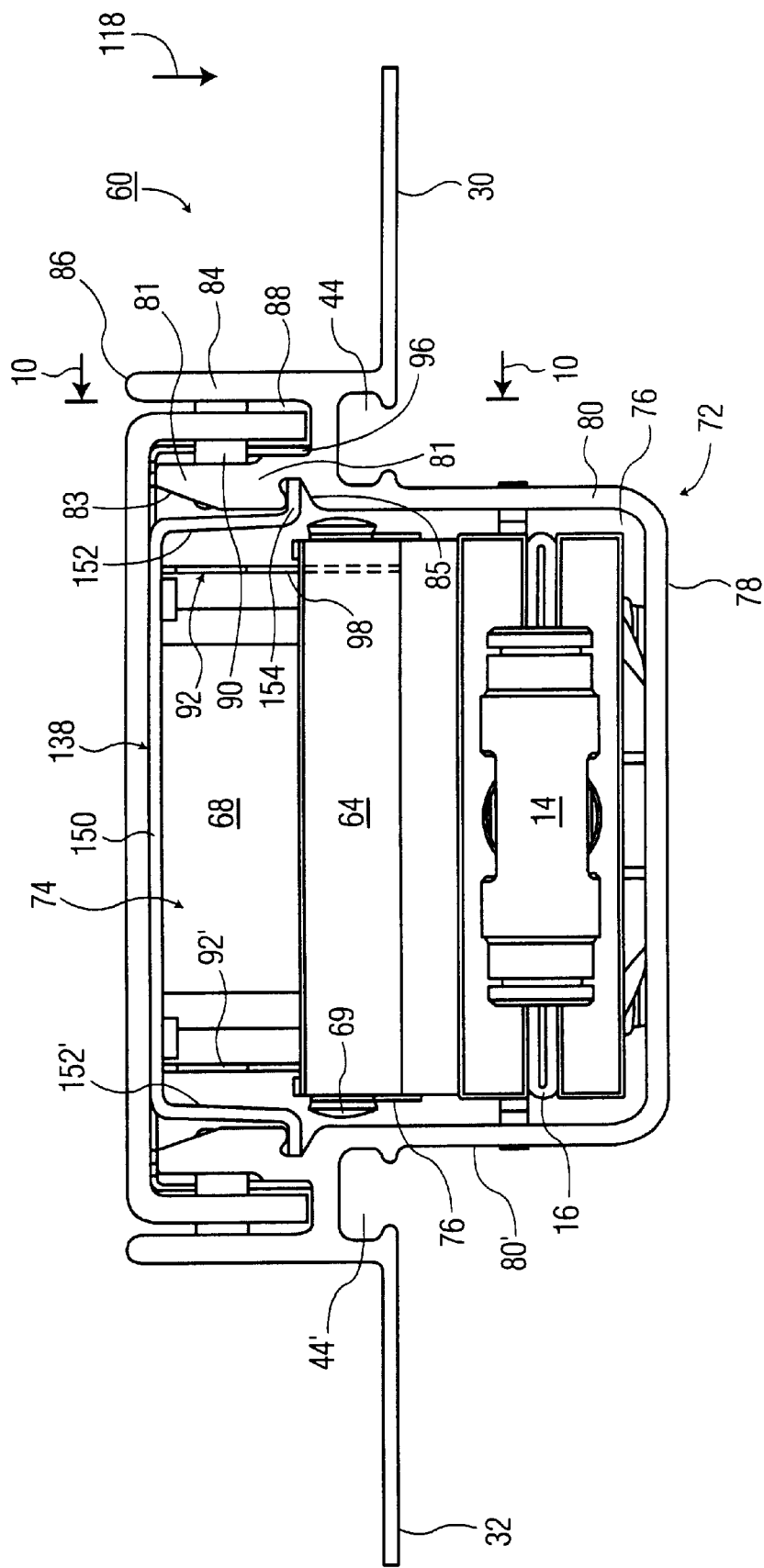
FIG. 7 is an end cross section elevation view of the assembled assembly of FIG. 6.

In FIGS. 5, 6 and 7 an exemplary embodiment of a roller track assembly 60 comprises an outer channel member 72 having a channel receptacle 76. Air bag 16 (not shown) attached to fitting 14 and clamp 18 is at the base of the receptacle 76. Inner roller channel assembly 74 is located in the receptacle 76 over the air bag 16. The assembly 74 includes rollers 68 assembled to inner roller channel member 64 as in the embodiment of FIG. 3. The bottom wall 65 of member 64 rests on air bag 16. It is contemplated that rollers 68 of assembly 74 can be replaced by other roller devices rotatably mounted on suitable pivots for moving or conveying cargo. For example, support rollers 68 as shown in FIG. 5, in the alternative, can be replaced with roller balls, ball bearings, tapered rollers, thrust bearings, spherical bearings (all not shown) or any other roller conveying device mounted on appropriate axes on which cargo is movably supported for manual translation. The ball bearings, as one example, have the same up and down movement, as described with regard to rollers 68 as shown in FIGS. 5 and 6. It should be appreciated by those of ordinary skill in the art that the mechanical support devices to which a roller or a ball bearing is mounted to assembly 74 will depend upon the type of roller or bearing desired to be used. By way of further example, conventional ball bearings mounted in races may be secured to fixed axles secured to inner channel member 64. In the alternative, the inner channel member may be formed as a race containing spherical ball bearings.

The outer channel member 72 is extruded aluminum and has a bottom wall 78 and side walls 80, 8', as shown in FIGS. 6 and 7. Walls 80, 80' are identical mirror images of each other and representative wall 80 will be described. Wall 80 has a channel 44 and flange 30 formed externally thereof as explained in the embodiment of FIG. 3. Wall 80 extends upwardly in the figure to end 82 at portion 81 and has a taper 83. An outer wall 84 parallel to portion 81 extends upwardly from the outer side of channel 44 terminating at end 86. Portion 81 and wall 84 form a channel 88. Pins 90, which preferably are metal, i.e., steel, are attached to wall portion 81 and wall 84 and pass transversely through the channel 88 normal to the axial direction of the channel member. Pins 90 also are also located in channel 88' attached to wall 80 '. An inclined channel 85, 85' is formed in the inner surface of respective wall portions 81, 81' of walls 80 and 80', the channels 85, 85' being mirror images of each other and horizontally aligned from left to right in the figure and facing each other across the receptacle 76.

A pair of identical mirror image U-shaped debris sealing covers 92, 92', FIG. 6, have a base 94 and legs 96 and 98 extending from the base. The covers 92, 92' correspond to and extend for the length of the channel member 64. The leg 96 is located in the channel 88 and the leg 98 is located in the channel of member 64 between an end of the rollers 68 and the inner surface of the side walls 70. The legs thus form a channel 100 which receives the wall portion 81. The covers 92, 92' are integral one piece construction, preferably stamped from thin relatively strong, but flexible material such as metal or aluminum. The channel 100 extends longitudinally along axis defined by the longitudinal lengths of the channel members.

A series of spaced apart vertical slots 102 are formed in the leg 98. The slots 102 provide clearance for the roller shafts 69. The shafts extend from and are attached to the inner channel member 64. As the member 64 is raised, the slots 102 receive the shafts 69 so that the rollers 68 and channel member 64 may be raised and lowered without interference. Preferably, the slots 102 are shaped to receive, but are slightly larger than, the diameter of the roller shafts 69 so that the shafts will not rub against the leg 98.

A second series of spaced vertical slots 104 are in leg 96. These slots receive the pins 90 and prevent movement of the cover along axis 83. As members 92, 92' remain fixed, slots 102 receiving shafts 69 also prevent movement of member 74 along axis 83.

A U-shaped top plate 106 has a flat base member 108 and two depending flanges 110 and 110', which are identical mirror images of each other. The top plate member 108 has rectangular openings 112 for receiving the rollers 68, a roller 68 passing through an opening 112 as it is raised. The flanges 110 and 110' have identical transversely aligned R-shaped slots 114, FIG. 10. The slots have a vertical component normal to the axial direction of the channel members and a horizontal component that extends in an axial direction of the channel members. The slots 114 are oriented in the same direction on both flanges 110 and 110'. The slots 114 receive the pins 90 in the outer channel member. The slots 114 have a first component portion 122 extending in one of the axial directions 116 of the top plate and of the channel members such as direction 121 and a second component portion 124 that extends in the vertical direction 118.

To assemble the roller track assembly illustrated in FIGS. 5, 6 and 7, the air bag 16, the fitting 14 and the clamp assembly 18 are placed in the outer channel member 72 receptacle 76 and pushed downwardly until they rest near bottom wall 78. The air bag 16 extends substantially along the length of the bottom wall 78 along the channel member longitudinal axis 83 until the end of the air bag 16 is positioned near the end of the outer channel member 72. Once the air bag 16 has been so extended, the fitting 14 is connected to a fluid source, such as an air compressor, to provide pressurized fluid to selectably inflate the air bag 16 to raise and lower the inner channel assembly 74 and thus the rollers 68.

Inner channel assembly 74 is then placed in position within the receptacle 76 of the outer channel member 72, FIG. 6.

Covers 92 and 92' are placed in their pre-selected alignment over the wall portion 81 until each slot 102 is aligned with and receives a rollers 68 shaft and each slot 104 receives a pin 90 in the channel 88. The covers 92 and 92' prevent most debris that falls through the openings 112 of the top plate 106 from falling into the outer channel member 72 receptacle in the interface region between the inner and outer channel members side walls. Such debris could get entrapped in the lower portion of the channel receptacle 76 and cause damage to the components of the assembly, such as the air bag 16.

Figure 10:
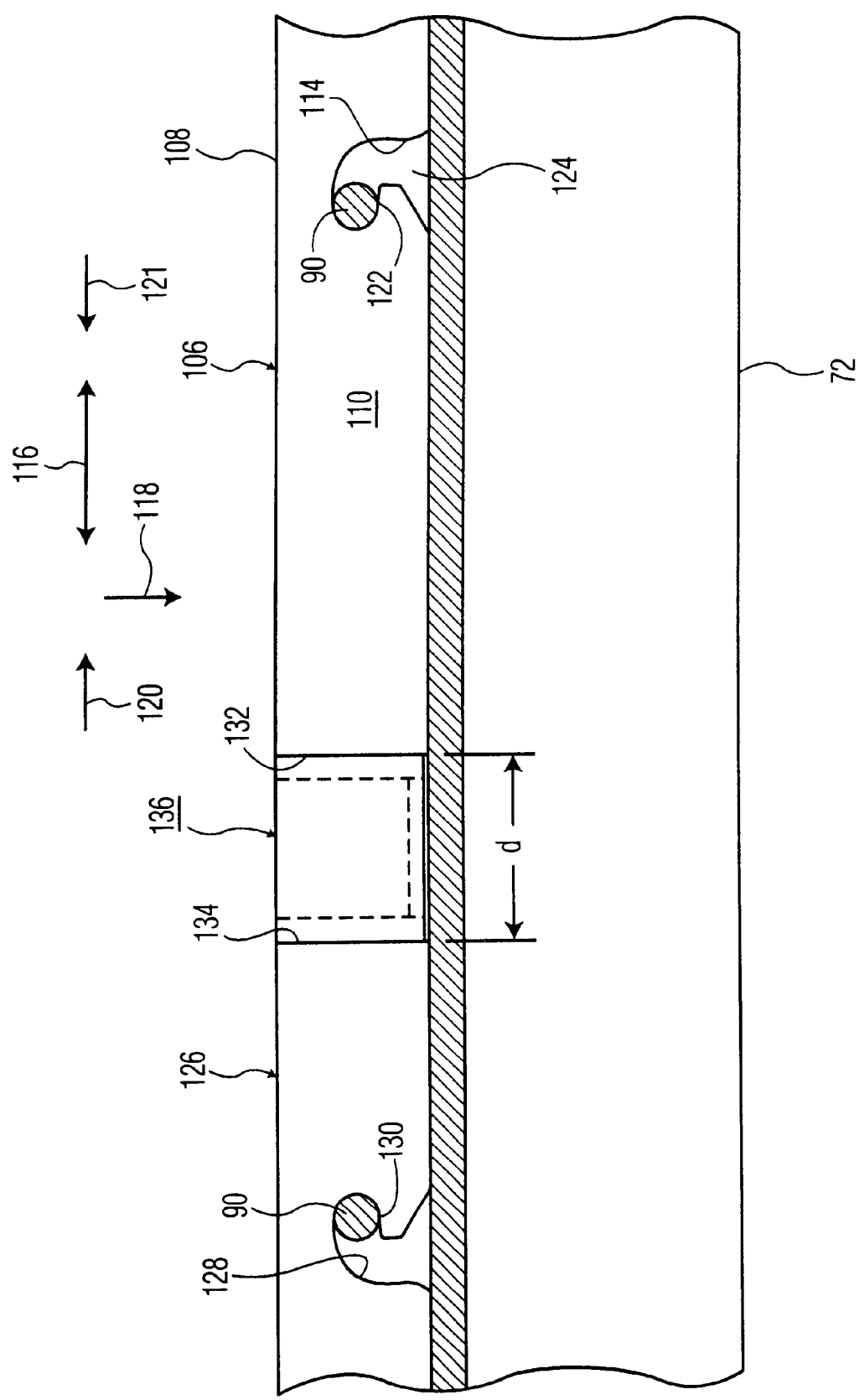
FIG. 10 is side elevation view of the embodiment of FIG. 7 taken along lines 10—10.
Figure 11:
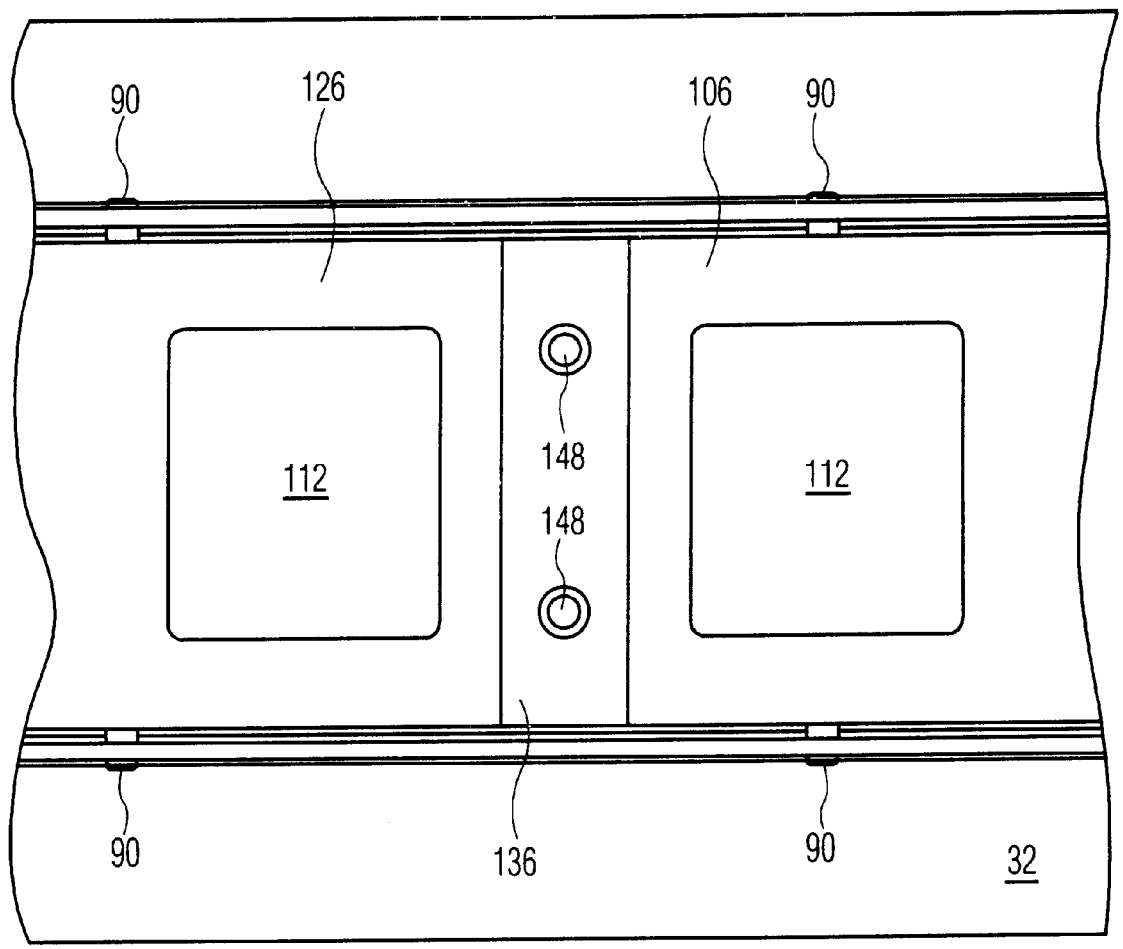
FIG. 11 is a fragmented top plan view of the assembly of FIG. 10.

The top plate 106, FIG. 10, is then attached to the outer channel member 72 by inserting the flanges 110, 110', in the channels 88, 88', respectively. The top plate slots 114 are engaged with the pins 90. Because of the two component normal directions of the R-shape of the slots 114, the top plate is first inserted downwardly in the vertical direction 118 until the pins 90 are fully seated vertically in the slot portions 124. Then the top plate 106 is moved axially in direction 120 relative to the outer channel member 72 to seat the pins 90 in the axial direction in slot portions 122 sliding the top plate axially in the appropriate direction along the outer channel member 72.

In FIG. 10, a second top plate 126 having R-shaped slots 128 with their axial component portions oriented in a reverse axial orientation as the orientation of slots 114 is attached to pins 90 in a second section of the outer member 72. The second top plate is otherwise identical to plate 106. The second top plate 126 is inserted in a reverse axial direction as plate 106 due to the reversal of orientation of the axial slot portions 130. In this way the top plates 106 and 126 are inserted by axial displacement in opposite directions during engagement with the pins 90. Plate 106 when installed and seated as described has an edge 132 that is spaced from edge 134 of top plate 126 a distance d forming a gap therebetween. The gap is needed to permit the axial displacement of the top plates during installation and removal from the mating pins.

To prevent the top plates from axially displacing after installation in response to movement of loads on the top plate, a locking plate assembly 136, FIGS. 5, 6 and 7, is in the gap between edges 132 and 134. The assembly 136 comprises a stamped sheet metal, steel or aluminum, relative sturdy locking plate 138 and an attachment spring sheet metal clip 140. In FIGS. 5 and 6, locking plate 138 is U-shaped having a flat plate base 142 and two spaced like depending flanges 144 at opposite ends of the base 142. The flanges 144 are coextensive and fit between the flanges 110 and 110' of the top plate 106 and corresponding flanges of the top plate 126, FIG. 10. The base 142 has openings 146, FIGS. 5 and 6. Rivets 148 extend through the base 142, FIG. 6. The installed base 142 is coextensive with the base members of the top plates 106 and 126.

Clip 140, FIGS. 5 and 6, is U-shaped and has a base member 150 and two like mirror image spring legs 152 and 152'. Each leg 152 and 152' terminates distal the base in a lip 154. The lips extend in opposite directions and are normal to its corresponding leg 152, 152'. The clip is attached to the locking plate by rivets 148 which pass through openings in the clip base member 150 to the under side surface of the base member 150.

To assemble the locking plate assembly 136, after the top plates 106 and 126, FIG. 10 are assembled, the locking plate assembly is then attached to the outer channel member in the gap distance d between the top plates. The clip lips 154, FIG. 6, which are flat outwardly extending tabs, are spring engaged with the channels 85, 85' to lock the assembly 136 vertically in place to the outer channel member 72. With the plate assembly 136 in place, the top plates 106 and 126 can no longer axial displace toward each other in the gap distance d to dislodge the plate slots 114 from the pins 90. Because adjacent top plates are oriented with the slots mating the pins 90 in 180° opposite directions, the engagement of the slots 114 with pins 90 of one top plate resists axial displacement in one direction while the similar engagement of the next adjacent top plate and pins 90 resists axial displacement in the opposite direction. This further enhances the locking action and securing of the top plates to the outer channel member. That is, a load on the top plates which tends to displace one top plate axially in either of two opposite directions, is resisted by one of the top plate's slot and pin engagements. The locking plate 138 base 142 openings 146 permit a tool to be inserted therethrough to disengage the lips 154 from the channels 85, 85' to remove the locking plate assembly 136.

In operation, the covers 92 creates a seal that prevents most debris and other foreign objects that may fall through the openings 112 in the top plate 106 from damaging the air bag 16 or other components housed in the outer channel member 72. For example, debris, such as small rocks or dirt, may fall through the opening 112. Debris that falls through the openings 112 will not enter the interface space between the inner and outer channel members as this space is covered by the covers.

Figure 8:
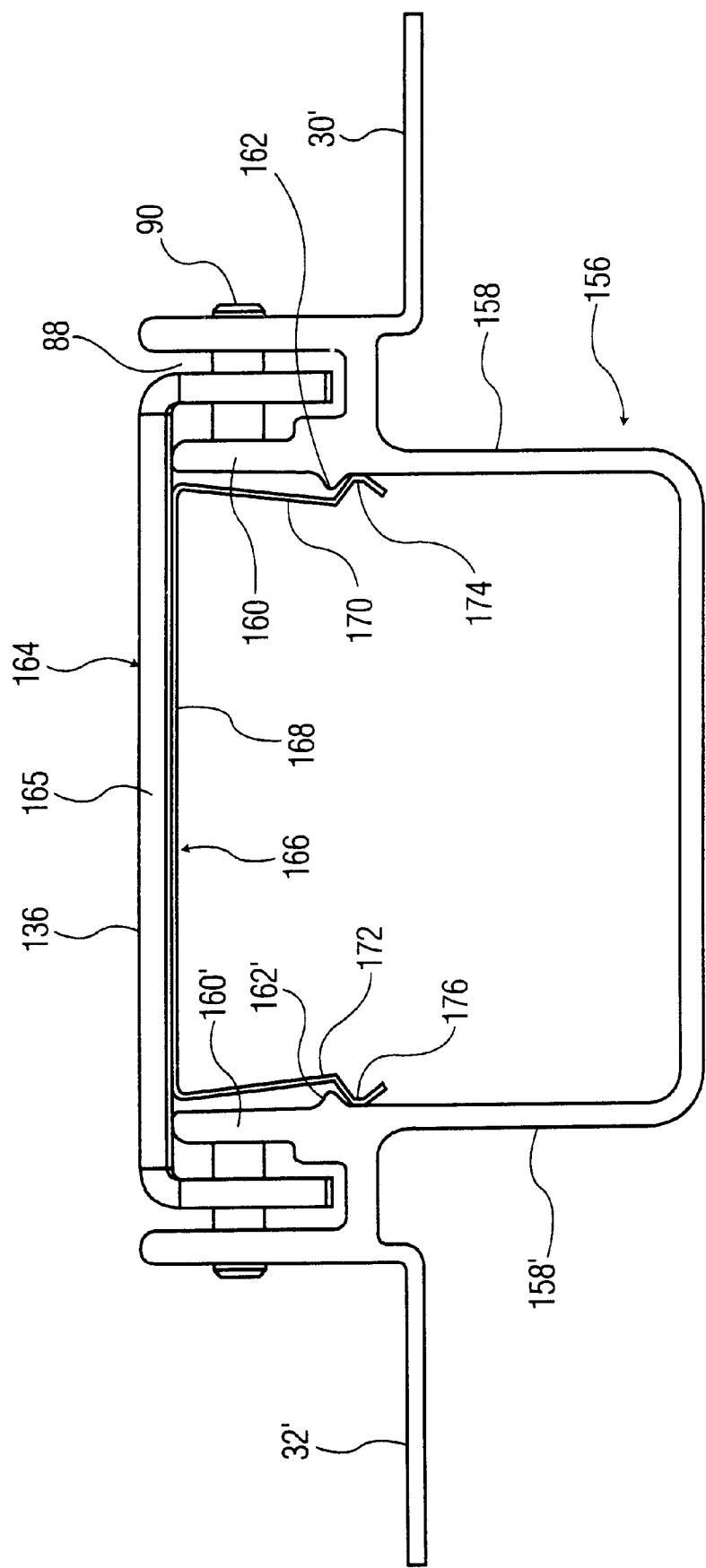
FIG. 8 is a sectional end elevational view of a of a partially assembled roller track assembly illustrating a second embodiment of a spring clip to hold the top plate in place.
Figure 9:
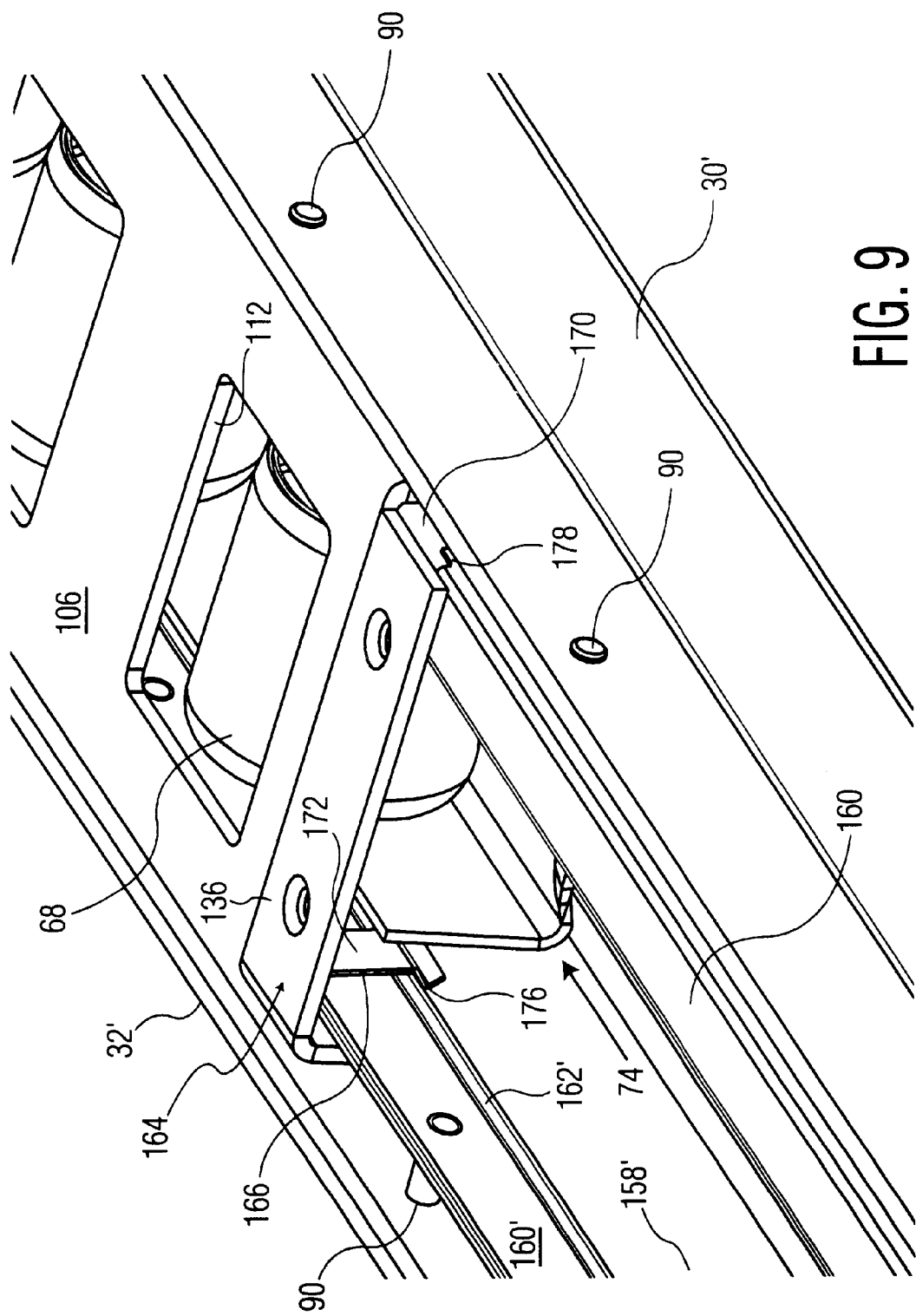
FIG. 9 is an isometric view of the embodiment of FIG. 8.

In FIGS. 8 and 9, an alternative embodiment of a locking plate and attachment clip are shown. In FIG. 8, outer channel member 156 has side walls 158 and 158' with an upper portion 160 and 160' respectively. Walls 158 and 158' are mirror images of each other and wall 158 will be described as representative. Portion 160 has a triangular rib 162 facing inwardly into the channel 162 of the member 156 for the axial length of the channel member 156. Channel 88 is formed otherwise by the same elements as in the member 72 of FIGS. 5 and 6. The rib 162 is used in place of the channel 85 of the FIG. 6 embodiment.

Locking plate assembly 164 comprises locking plate 136 as described above in connection with FIGS. 5 and 6. Spring clip 166 is different than clip 140. Clip 166 has a base 168 that is fastened to the locking plate base with rivets (not shown) as described above in connection with the embodiment of FIG. 6 or by welds. The clip 166 has two mirror image like spring-like legs 170 and 172 each with a detent bend 174, 176, respectively. The detent bend 174 catches and engages the rib 162 to releaseably secure the locking plate assembly to the outer channel member 156. Openings 178 (FIG. 9) receive a tool (not shown) to permit the tool to lift the locking plate and resiliently disengage the detent bends 174 and 176 from the ribs 162 and 162'.

There thus has been described a quick release roller track assembly top plate that can be quickly assembled and removed by the use of detent means without screws or similar fasteners. By merely inserting a tool through the openings in the locking plate and disengaging the spring clip detent engagement with the outer channel member, the locking plate assembly can be easily removed. Once so removed, a desired top plate is first axially displaced to place the locking slots 114 in a vertical release position with respect to the mating locking pins 90 on the outer channel member. Then the top is easily lifted off of the outer channel member to expose the inner components of the roller track assembly. In the embodiment of FIGS. 8 and 9, the detent mechanism of the locking plate assembly requires no tool to be inserted through the locking plate, but merely requires a sufficient lifting force to disengage the locking force of the engaged locking spring detent.

The engagement of the pins 90 with the openings 114 and 129, FIG. 10, with the locking plate assembly 136 in place provides a secure detent locking of the top plates and yet a simple removal of the locking plate assemblies releases the top plates for quick removal. This avoids the tedious removal of numerous screws or fasteners as in the prior art assemblies.

The present invention provides flexibility so that the top plates may be readily installed and removed without fasteners. For example, the configuration of the pins and mating locking openings between the top plates and the outer channel member may take different shapes that will perform equivalent functions. The openings need not be R-shaped but may have other axial and vertical shapes as well. The pins 90 may be replaced by bosses or other detent arrangements to lock the top plate in place. For example, the top plate may be connected to the outer channel member by detents or clips similarly as the locking plate assemblies. In this case, an end plate (not shown) with locking pin detents can be used to axially lock the top plate in place. The clips attached to the top plate keep the top plate from vertically lifting off of the outer channel member. The end plate can use openings and pins as in the top plates disclosed herein to axially lock the end plate in place or screws or other similar fasteners as such fasteners need not be removed to remove the top plates.

In the claims, the term "detent means" includes various structures excluding fasteners such as screws and rivets for engaging two components, such as fittings which engage without screws or pins and openings wherein one member is rotated relative to the other member to disengage the members, for example, as described above herein as well as snap fit resilient mating engaging means such as the spring clips and mating recesses or ribs which snap fit together.

It will occur to one of ordinary skill that still other various modifications may be made to the disclosed embodiments. The present invention may be embodied in other specific forms without departing from the spirit or essential attributes thereof, and accordingly, reference should be made to the appended claims, rather than to the foregoing specification, as indicating the scope of the invention.

What is claimed is:

1. A track assembly for selectively supporting a load during movement of the load into position in an axial direction, the assembly comprising:

an outer channel member having a bottom wall and oppositely disposed side walls defining a first channel extending in the axial direction;

an inner channel member extending in the axial direction;

an inflatable air bag disposed in the first channel for supporting the inner channel member, the inner channel member being movably disposed within the outer channel member for movement in a direction normal to the axial direction;

a plurality of rollers attached to the inner channel member, the rollers for moving between a lowered position to a raised position normal to the axial direction in response to the inflated condition of the air bag;

a top plate having a series of openings through which the rollers project when the air bag is inflated; and detent means for releaseably securing the top plate to the outer channel member.

2. The assembly of claim 1 wherein the detent means comprises a plurality of pins in the outer member in an axially extending array and a plurality of slots in the top plate each of which mates with and releaseably engages a different pin.

3. The assembly of claim 2 wherein the slots have first and second portions in which a first portion is normal to a second portion, the first portion extending in a first direction parallel to the axial direction and the second portion extending in a second direction normal to the axial direction.

4. The assembly of claim 3 wherein the outer channel member side walls each further comprise a second axially extending channel, the pins extending transversely through the second channel transverse the axial direction, the top plate having an axially extending flange with said slots for engaging said second channel.

5. The assembly of claim 1 wherein the detent means comprises means which require the top plate to be vertically engaged in a direction normal to the axial direction and then sequentially displaced in the axial direction to engage the top plate with the outer channel member.

6. The assembly of claim 5 further including a locking plate assembly attached to the outer channel member for selectively preventing said axial displacement of the top plate attached to the outer channel member.

7. The assembly of claim 6 including first and second top plates wherein the locking plate assembly includes a locking plate for abutting the first and second top plates in the axial direction and the detent means includes a spring clip attached to the locking plate for resiliently engaging the outer channel member.

8. The assembly of claim 7 wherein the outer channel member includes one of a rib and detent channel for said resiliently engaging.

9. The assembly of claim 3 further including first and second top plates attached to said outer channel member in an axial array, the second portion of the slots in the first top plate extending in a third direction opposite the second direction and opposite the second portion direction of the second top plate.

10. The assembly of claim 9 wherein the first and second top plates are in spaced axial relation defining an axially extending space therebetween, further including a locking plate between the first and second top plates in said axially extending space for precluding axial displacement of the first and second top plates toward each other.

11. The assembly of claim 10 including a clip attached to the locking plate for resiliently securing the locking plate to the outer channel member.

12. The assembly of claim 1 wherein the inner channel member has a pair of opposing side walls each corresponding to and spaced from an outer channel side wall forming first and second interface regions, further including a pair of sealing covers for precluding debris from entering the outer member channel through the first and second interface regions.

13. The assembly of claim 1, wherein the rollers are ball bearings.

14. The assembly of claim 1, wherein the rollers are cargo support rollers.

15. The assembly of claim 1, wherein the rollers are tapered rollers.

* * * * *

UNITED STATES PATENT AND TRADEMARK OFFICE
CERTIFICATE OF CORRECTION

PATENT NO.   : 6,554,116 B2
DATED        : April 29, 2003
INVENTOR(S)  : Matthew J. Ransil It is certified that error appears in the above-identified patent and that said Letters Patent is hereby corrected as shown below:

<u>Column 5,</u>
Line 13, change "8" to -- 80' --

<u>Column 6,</u>
Line 67, change "relative" to -- relatively --

Signed and Sealed this

Sixteenth Day of September, 2003

JAMES E. ROGAN
*Director of the United States Patent and Trademark Office*